United States Patent [19]

Yamakawa et al.

[11] Patent Number: 6,079,264
[45] Date of Patent: *Jun. 27, 2000

[54] THERMAL FLOW SENSOR SUPPORTING ELEMENT HAVING A GRADUALLY INCREASED PORTION BETWEEN ITS DISTAL ENDS

[75] Inventors: Tomoya Yamakawa; Masahiro Kawai; Akira Yamashita; Yutaka Ohashi, all of Tokyo, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/935,056

[22] Filed: Sep. 22, 1997

[30] Foreign Application Priority Data

Apr. 17, 1997 [JP] Japan ................... 9-100584

[51] Int. Cl.⁷ ....................................... G01F 1/68
[52] U.S. Cl. ..................... 73/204.26; 73/204.22
[58] Field of Search ................ 73/204.21, 204.22, 73/204.26, 204.25, 118.2

[56] References Cited

U.S. PATENT DOCUMENTS

| | | | |
|---|---|---|---|
| 4,624,138 | 11/1986 | Ono et al. | 73/204.21 |
| 4,843,882 | 7/1989 | Ohta et al. | 73/204.26 |
| 4,864,855 | 9/1989 | Shiraishi et al. | 73/204.21 |
| 4,981,035 | 1/1991 | Hall | 73/204.21 |
| 5,520,047 | 5/1996 | Takahashi et al. | 73/204.26 |
| 5,631,417 | 5/1997 | Harrington et al. | 73/204.26 |

FOREIGN PATENT DOCUMENTS

| | | |
|---|---|---|
| 0 295 647 A1 | 6/1988 | European Pat. Off. . |
| 31 35 793 A1 | 9/1981 | Germany . |
| 5-7659 | 1/1985 | Japan . |
| 3-67128 | 3/1991 | Japan . |
| 5-142008 | of 1993 | Japan . |
| 6-50783 | of 1994 | Japan . |

OTHER PUBLICATIONS

Korean Office Action dated Jul. 26, 1999 with attached English translation of the relevant portions thereof.

*Primary Examiner*—Harshad Patel
*Attorney, Agent, or Firm*—Sughrue, Mion, Zinn, Macpeak & Seas, PLLC

[57] ABSTRACT

A flow rate detector has a detection pipe (26) disposed in a fluid channel (21), a supporting member (27) for supporting a thermosensitive flow rate sensor (28) being provided in the detection pipe (26). The supporting member (27) has a sensor holding portion (27a) which has a predetermined width and a broadening portion (27b) which is adjacent to one end of the sensor holding portion (27a) and the width of which gradually increases from the distal end thereof toward the sensor holding portion (27a). The flow rate sensor (28) is built in a side surface of the sensor holding portion (27a) such that it is exposed in the detection pipe (26).

15 Claims, 12 Drawing Sheets

THERMAL FLOW SENSOR SUPPORTING ELEMENT HAVING A GRADUALLY INCREASED PORTION BETWEEN ITS DISTAL ENDS

BACKGROUND OF THE INVENTION

1. Field of the Invention

The present invention relates to a flow rate detector which is used for measuring the amount of air introduced into, for example, an internal-combustion engine, and other applications, and which is designed to measure the flow velocity or the flow rate of fluid by making effective use of the phenomenon wherein the heat is transferred to the fluid from a heating element or a portion which has been heated by the heating element.

2. Description of Related Art

Figure 18:
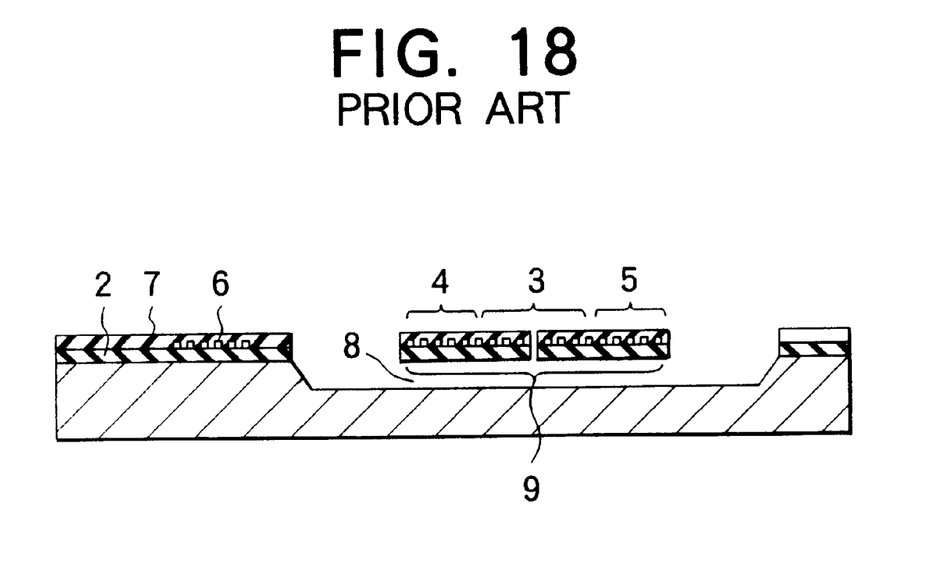
FIG. 18 is a sectional view showing an example of a conventional thermosensitive flow rate sensor.
Figure 19:
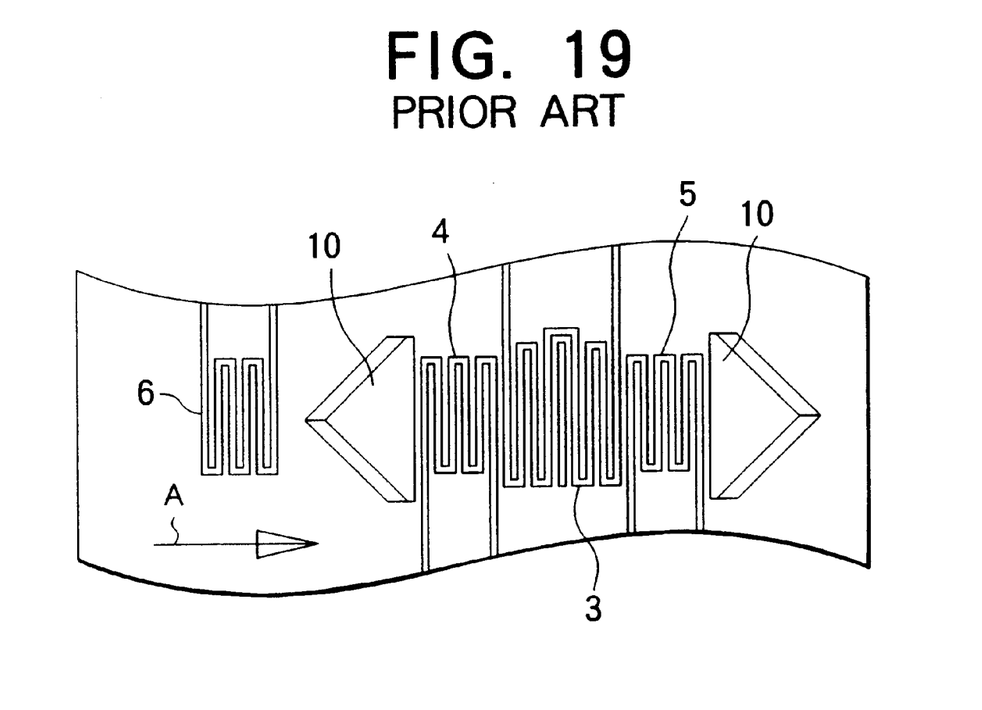
FIG. 19 is a top plan view showing the sensor in FIG. 18 with a protective film removed.

FIG. 18 is a sectional view showing a conventional bridge-type thermosensitive flow rate sensor disclosed, for example, in Japanese Patent Publication No. 5-7659; FIG. 19 is a top plan view of the flow rate sensor shown in FIG. 18 with a protective film removed. In the drawings, an insulating support film 2 composed of silicon nitride is formed on a flat substrate 1 composed of a silicon semiconductor. Formed on the support film 2 are a heat generating resistor 3, temperature measuring resistors 4 and 5, and a comparison resistor 6 which are composed of permalloys, i.e. thermosensitive resistors. The heat generating resistor 3 is disposed between the temperature measuring resistors 4 and 5; and the comparison resistor 6 is disposed with a predetermined distance from the temperature measuring resistor 4.

Formed on the support film 2 and the resistors 4 to 6 is an insulating protective film 7 composed of silicon nitride. An air gap 8 is provided in a portion of the substrate 1 where the heat generating resistor 3 and the temperature measuring resistors 4 and 5 are located, thus forming a bridge portion 9. The air gap 8 is formed by removing a part of the substrate 1 through an opening 10 by using an etchant which does not attack silicon nitride.

In such a conventional flow rate sensor, the heating current supplied to the heat generating resistor 3 is controlled by a controlling circuit, not shown, so that the temperature of the heat generating resistor 3 is 200 degrees Celsius higher than the temperature of the substrate 1 detected at the comparison resistor 6. Since the air gap 8 is provided under the heat generating resistor 3, the heat generated at the heat generating resistor 3 is hardly transferred to the comparison resistor 6, and the temperature of the comparison resistor 6 becomes nearly equal to air temperature.

The heat generated at the heat generating resistor 3 is transmitted to the temperature measuring resistors 4 and 5 mainly via the support film 2 and the protective film 3. Since the heat generating resistor 3 and the temperature measuring resistors 4, 5 have a symmetrical shape, there is no difference in resistance between the temperature measuring resistors 4 and 5 when there is no air flow. When an air flow is generated, the temperature measuring resistor located on the upstream side is cooled by the air, while the temperature measuring resistor located on the downstream side is not cooled as much as the upstream temperature measuring resistor because the heat is transmitted from the heat generating resistor 3 via the air.

For instance, when an air current is produced in the direction indicated by arrow A in FIG. 19, the temperature of the temperature measuring resistor 4 becomes lower than the temperature of the temperature measuring resistor 5; the difference in resistance between the two temperature measuring resistors increases as the flow velocity increases. Hence, the flow velocity can be measured by detecting the difference in resistance between the temperature measuring resistors 4 and 5. In addition, the flowing direction of a fluid can be also detected by determining which of the temperature measuring resistors 4 and 5 has a lower temperature.

Figure 20:
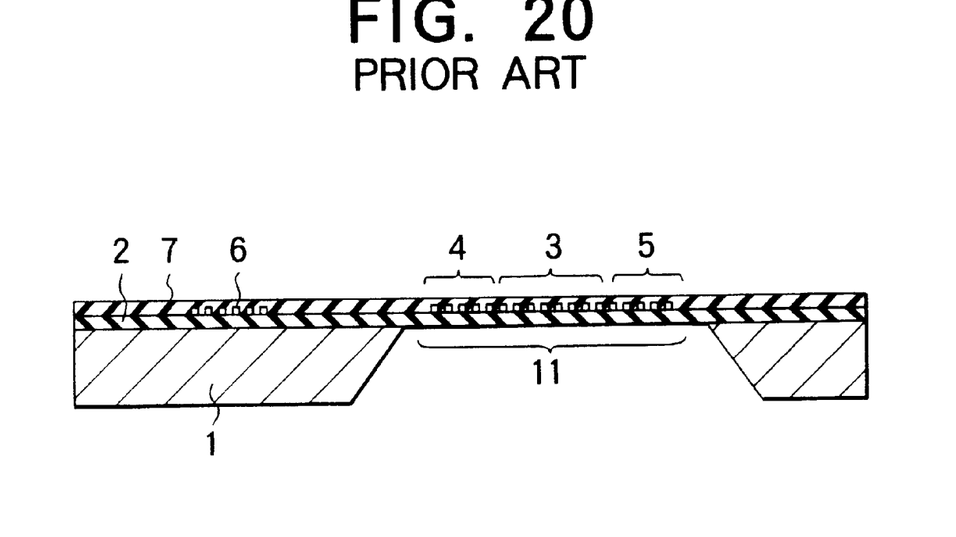
FIG. 20 is a sectional view showing another example of the conventional thermosensitive flow rate sensor.
Figure 21:
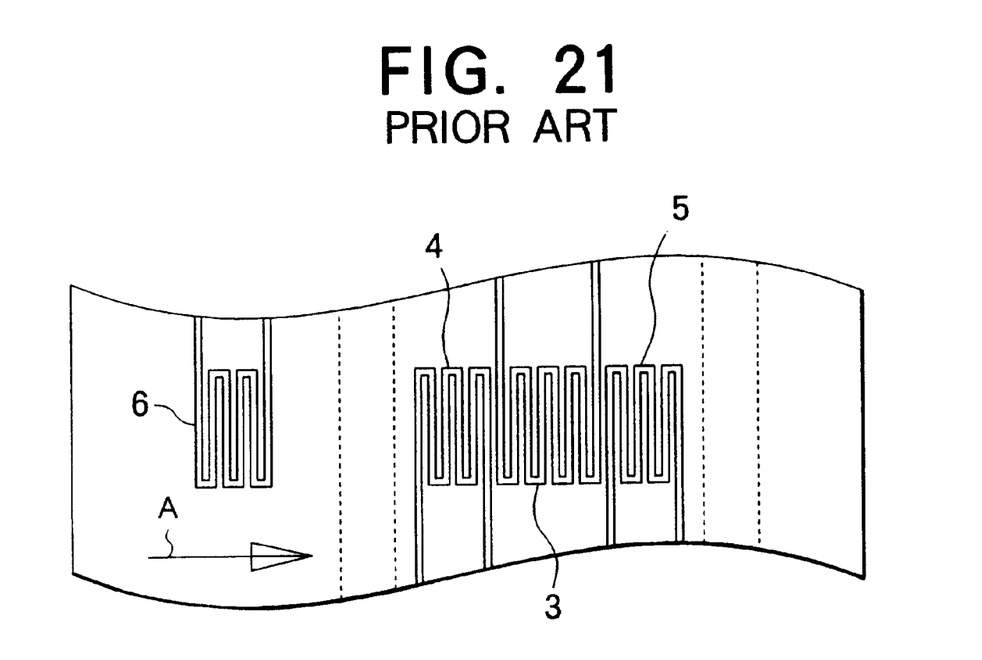
FIG. 21 is a top plan view showing the sensor in FIG. 20 with a protective film removed.

FIG. 20 is a sectional view showing a conventional diaphragm type thermosensitive flow rate sensor; FIG. 21 is a top plan view of the flow rate sensor shown in FIG. 20 with a protective film removed. The portion of the substrate 1 where the heat generating resistor 3 and the temperature measuring resistors 4, 5 are formed has been produced by eliminating a part of the substrate 1 from the rear surface by etching or other means so as to form a diaphragm 11. This diaphragm type flow rate sensor employs the same principle as the bridge type to detect flow rate.

Figure 22:
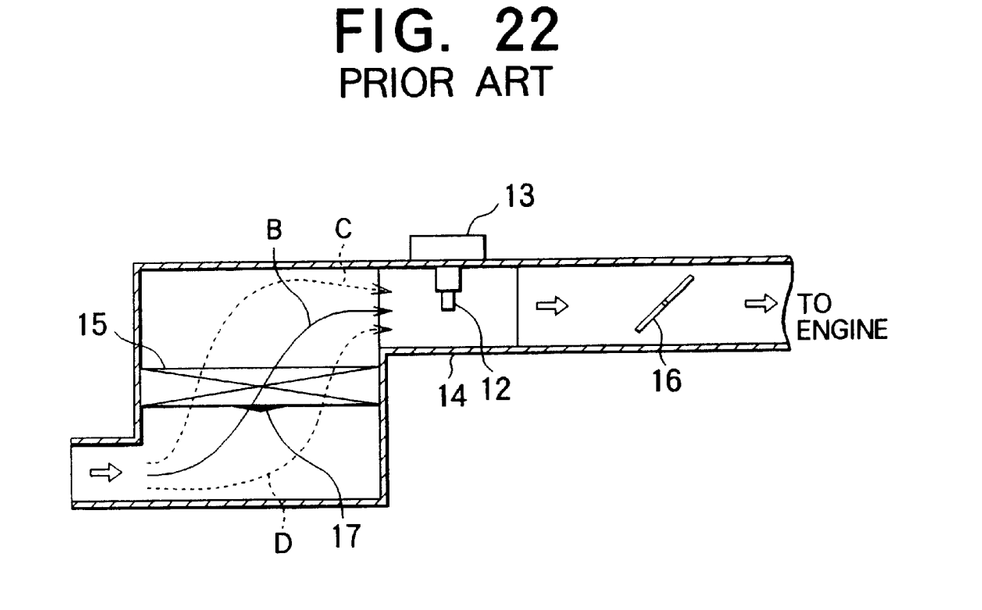
FIG. 22 is a sectional view showing an example of the disposition of the conventional thermosensitive flow rate sensor.

FIG. 22 is a sectional view showing an example of the disposition of a conventional thermosensitive flow rate sensor; the thermosensitive flow rate sensor is used as an intake air volume sensor for an automotive engine. In the drawing, a flow rate detector 14 which has a thermosensitive flow rate sensor 12 and a circuit unit 13 connected to the flow rate sensor 12 is connected to the downstream side of an air cleaner element 15. A throttle valve 16 is provided on the downstream side of the flow rate detector 14.

In the configuration described above, dust 17 in the intake air is trapped by the air cleaner element 15, and the air cleaner element 15 is clogged in the course of traveling, causing the air current to be deflected on the downstream side of the air cleaner element 15. More specifically, the air current mostly flows as indicated by arrow B at the beginning, but it comes to flow as indicated by arrow C or D as dust 17 builds up on the air cleaner element 15. Furthermore, since the throttle valve 16 is located on the downstream side of the flow rate sensor 12, the flow is also deflected on the downstream side of the flow rate sensor 12.

Installing the conventional thermosensitive flow rate sensor thus constructed in a fluid channel causes the air current to separate at the leading edge of the sensor and to generate eddies at random. The generated eddies merge and reattach to the sensor, adding to the disturbance in the flow on the surface of the sensor; therefore, the signal-to-noise ratio drops, making it impossible to achieve satisfactory sensitivity.

A sensor disposed on the inner wall surface of a fluid channel or on the inner wall surface of the casing installed in the fluid channel is disclosed in, for example, Japanese Patent Laid-Open No. 5-142008 or Japanese Patent Laid-Open No. 6-50783. This sensor, however, is failing to provide satisfactory detecting performance when the flow develops deflection as shown in FIG. 22. In general, when the flow is deflected in the fluid channel, the change in the flow velocity on the inner wall of the channel greatly increases in comparison with the change in the flow velocity at the center of the channel. Hence, the flow rate detecting performance is seriously affected when the sensor is mounted on the wall surface of the fluid channel.

Further, a sensor disposed in a flat rectangular casing is disclosed in Japanese Patent Laid-Open No. 6-50783. This sensor, however, is not axially symmetric with respect to the flowing direction of a fluid to be measured; therefore, even when the flow rate of a fluid flowing through the fluid channel remains the same, deflection in the flow causes a change in the flow rate of the fluid running through the casing, depending on the direction of the deflection, thus adversely affecting the flow rate detecting performance.

SUMMARY OF THE INVENTION

The present invention has been made with a view toward solving the problems described above, and it is an object of the present invention to provide a flow rate detector which permits improved measurement sensitivity and higher signal-to-noise ratio and which is capable of minimizing a change in flow rate detecting characteristics even if the flow in a fluid channel is deflected.

To this end, according to one aspect of the present invention, there is provided a flow rate detector comprising: a detection pipe provided in a fluid channel; a supporting member provided in the detection pipe, the supporting member having a sensor holding portion and a broadening portion, the sensor holding portion having a predetermined width, the broadening portion being adjacent to one end of the sensor holding portion, the width of the broadening portion gradually increasing from its distal end toward the sensor holding portion; and a thermosensitive flow rate sensor built in a side surface of the sensor holding portion so that it is exposed in the detection pipe.

According to another aspect of the present invention, there is provided a flow rate detector comprising: a supporting member provided in a fluid channel, the supporting member having a sensor holding portion and a broadening portion, the sensor holding portion having a predetermined width and being provided with a recession in a side surface thereof, the broadening portion being adjacent to one end of the sensor holding portion, the width of the broadening portion gradually increasing from its distal end toward the sensor holding portion; and a thermosensitive flow rate sensor which is installed in the recession so that it is recessed from the side surface of the sensor holding portion.

DETAILED DESCRIPTION OF THE PREFERRED EMBODIMENTS

Referring to the attached drawings, the embodiments of the present invention will be described.

First Embodiment

Figure 1:
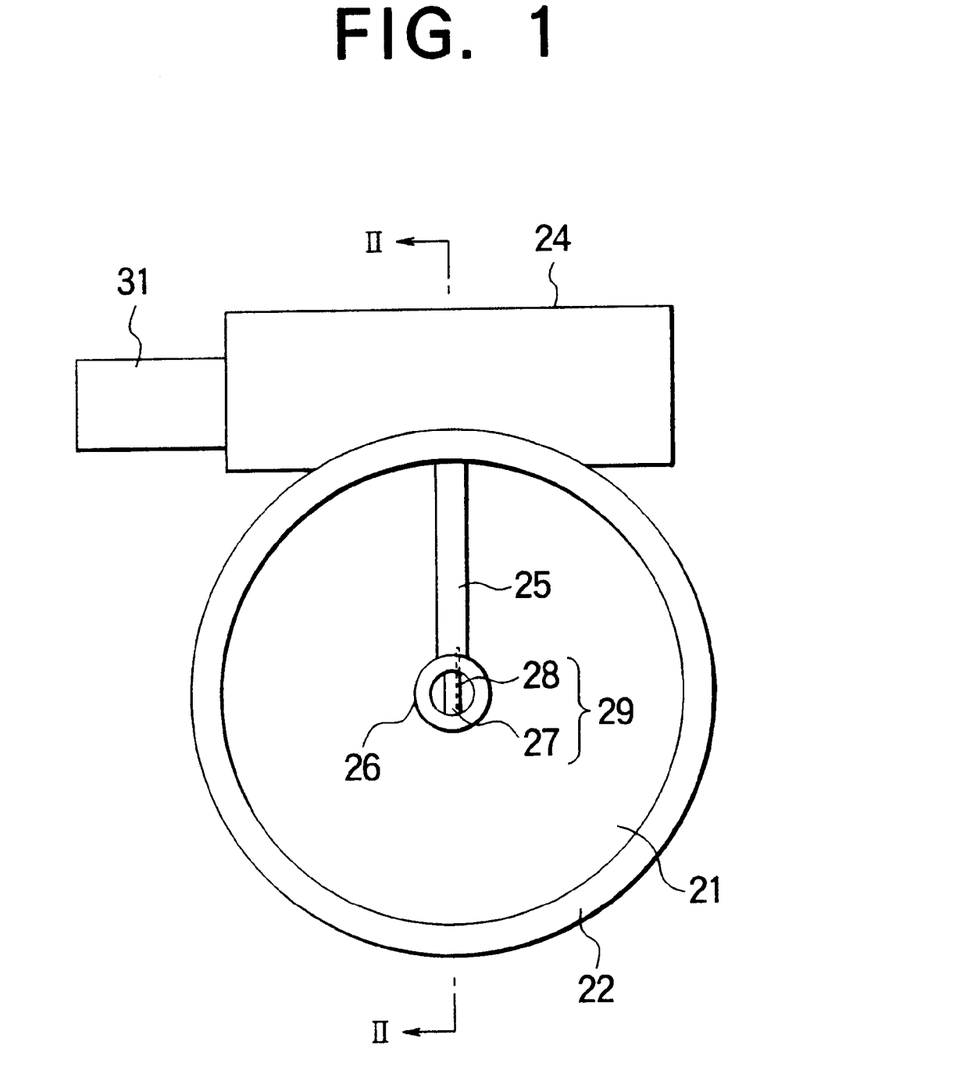
FIG. 1 is a front view showing a flow rate detector according to a first embodiment of the present invention.
Figure 2:
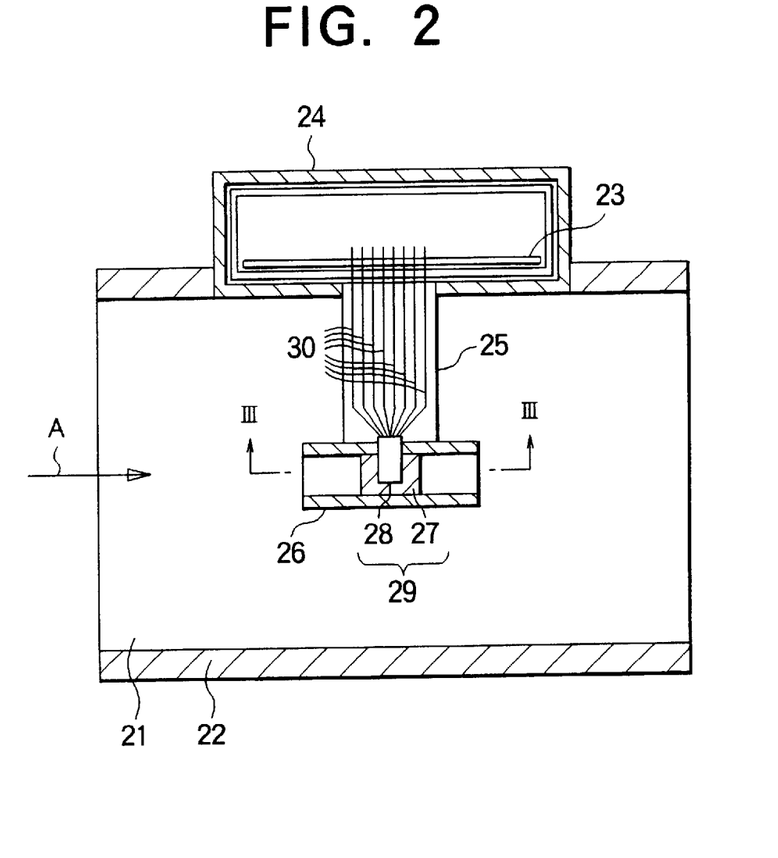
FIG. 2 is a sectional view at the line II—II in FIG. 1.
Figure 3:
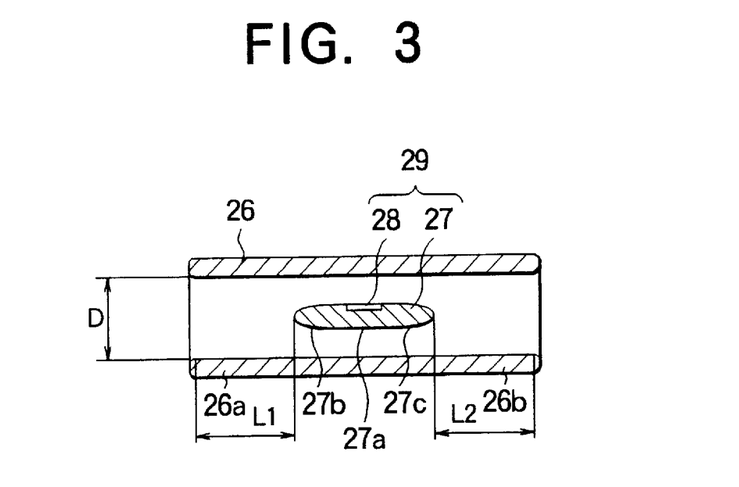
FIG. 3 is a sectional view at the line III—III in FIG. 2.

FIG. 1 is a front view showing a flow rate detector according to a first embodiment of the present invention; FIG. 2 is a sectional view at the line II—II in FIG. 1; and FIG. 3 is a sectional view at the line III—III in FIG. 2.

In the drawings, a fluid channel 21 is formed in a main channel pipe 22. A case 24 incorporating a circuit unit 23 is fixed on the wall of the main channel pipe 22. The circuit unit 23 is provided with a calorific value control circuit, an output circuit, etc. Fixed to the case 24 is a prop 25 jutting out in the fluid channel 21. A cylindrical detection pipe 26 is fixed to the distal end of the support 25 such that it is coaxial to the main channel pipe 22.

Fixed in the detection pipe 26 is a supporting member 27 in such a manner that it splits the section perpendicular to the axis of the pipe into two equal portions. The supporting member 27 has a sensor holding portion 27a which has a predetermined width and broadening portions 27b and 27c which are adjacent to both ends of the sensor holding portion 27a and which gradually widen toward the sensor holding portion 27a from the distal end thereof. Provided on the upstream and downstream sides of the supporting member 27 of the detection pipe 26 are straight pipe portions 26a and 26b whose lengths are half the inside diameter D, i.e. the radius, or greater of the detection pipe 26 (L1≧D/2, L2≧D/2) and which have a predetermined inside diameter.

A thermosensitive flow rate sensor, i.e. a flow rate detecting element, 28 is built in a side surface of the sensor holding portion 27a of the supporting member 27 such that it is exposed into the interior of the detection pipe 26. The configuration and the operating principle of the flow rate sensor 28 is identical to that shown in FIG. 18 or FIG. 20. A detecting structure 29 is constructed by the supporting member 27 and the flow rate sensor 28. The flow rate sensor 28 and the circuit unit 23 are electrically connected via a plurality of conducting lead wires 30 provided along the prop 25. The case 24 is equipped with a connector 31 for supplying power and output to external equipment.

In a flow rate detector thus constructed, even when the distribution of the flow velocity of a fluid to be measured, which fluid flowing through the fluid channel 21 becomes uneven or even when the direction of the deflection changes, the change in the flow velocity on the axis of the main channel pipe 22 is minimized as long as the flow rate remains the same. As a result, a change in the flow rate of the fluid introduced into the detection pipe 26 is minimized.

When the flowing direction of the fluid is as indicated by arrow A as shown in FIG. 2, since the supporting member 27 gradually broadens on the upstream side of the flow rate sensor 28, the section of the channel in the detection pipe 26 is narrowed, causing the flowing velocity to increase, thus restraining the separation at the surface of the supporting member 27. Further, since the surface of the flow rate sensor 28 is opposed to the inner wall surface of the detection pipe 26, the flow is controlled to be parallel so as to ensure a separation-free stabilized flow, thus permitting a good signal-to-noise ratio. In addition, the flow, which is parallel to the surface of the flow rate sensor 28, prevents dust in the fluid from bumping against and adhering to the flow rate sensor 28. Hence, a change in the flow rate detecting characteristics can be controlled even in a prolonged use.

Furthermore, since the broadening portion 27c is also provided on the downstream side of the sensor holding portion 27a, the separation of the flow at that point can be restrained, leading to a low drag force in the detection pipe 26. This makes it possible to increase the flowing velocity of the fluid moving on the surface of the flow rate sensor 28, permitting good detection sensitivity to be achieved and also minimized chances of the disturbance in the flow on the surface of the flow rate sensor 28 with a resultant good signal-to-noise ratio.

Furthermore, the supporting member 27 is disposed so that it divides the channel section in the detection pipe 26 into equal two segments, and the flow rate sensor 28 is disposed at the center in the detection pipe 26; therefore, even if the deflection in the flow remains in the detection pipe 26, the influences thereof can be minimized, accordingly permitting minimized measurement errors.

Moreover, the flowing direction of the fluid introduced in the detection pipe 26 is straightened in the straight pipe portion 26a and the broadening portion 27b of the supporting member 27 functions as a rectifying fin to rectify the flowing direction; therefore, the deflection in the flow of the fluid in the fluid channel 21 is corrected, thus further restraining a change in the flow rate detecting characteristics.

The rectifying effect provided by the straight pipe portion 26a is enhanced as the straight pipe portion 26a is made longer. The result of the experiments carried out by the inventors has revealed that satisfactory rectifying effect can be obtained when the length of the straight pipe portion is the radius (D/2) of the channel or more when the rectifying effect provided by the broadening portion 27b of the supporting member 27 is combined to the rectifying effect by the straight pipe portion. Thus, satisfactory rectifying effect can be accomplished without making the detection pipe 26 unnecessarily long.

In the embodiment described above, the broadening portions 27b and 27c are provided at both ends of the sensor holding portion 27a and the straight pipe portions 26a and 26b are provided on the upstream side and the downstream side, respectively, of the supporting member 27; therefore, even when the flowing direction of the fluid to be measured is reversed, good measurement sensitivity and signal-to-noise ration can be maintained, and a change in the flow rate detecting characteristics can be minimized against the flow deflection in the fluid channel.

Second Embodiment

Figure 4:
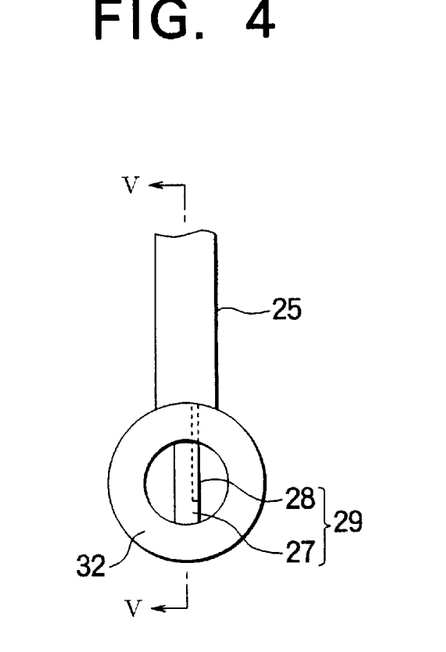
FIG. 4 is a front view showing a flow rate detector according to a second embodiment of the present invention.
Figure 5:
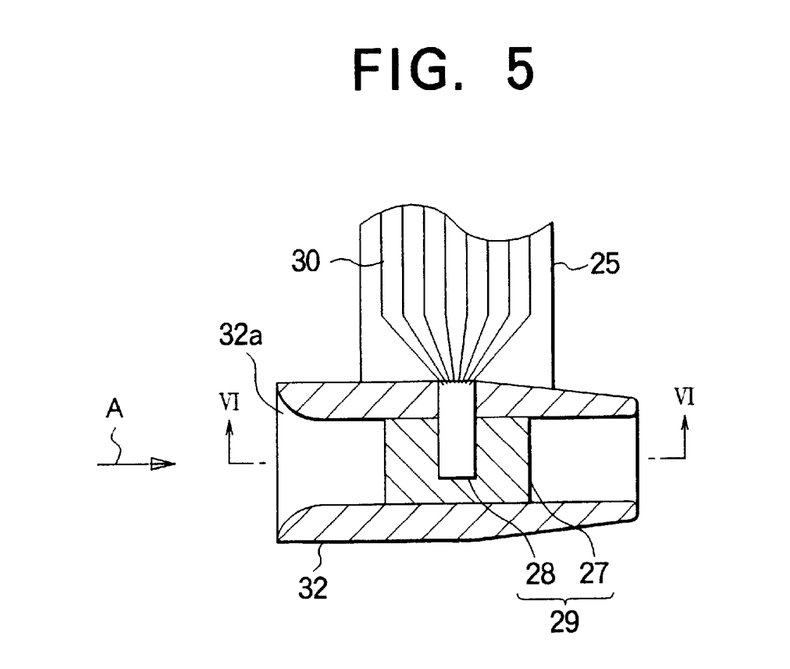
FIG. 5 is a sectional view at the line V—V in FIG. 4.
Figure 6:
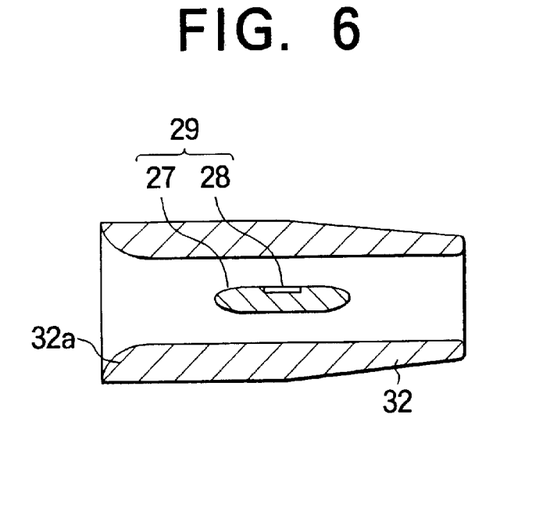
FIG. 6 is a sectional view at the line VI—VI in FIG. 5.

FIG. 4 is a front view showing a flow rate detector according to a second embodiment of the present invention; FIG. 5 is a sectional view at the line V—V in FIG. 4; and FIG. 6 is a sectional view at the line VI—VI in FIG. 5. In this embodiment, a detection pipe 32 having a bell-mouthed fluid inlet 32a is employed. The rest of the configuration of the second embodiment is the same as the configuration of the first embodiment described above.

In the flow rate detector according to the second embodiment, the bell-mouthed fluid inlet 32a contracts the flow to produce uniform flow velocity distribution in the detection pipe 32 even when the flow on the upstream side is severely deflected, thus allowing a change in the flow rate detecting characteristics to be restrained.

In this embodiment, only one end of the detection pipe 32 is shaped like the bell mouth; however, the other end thereof may also have the bell mouth shape. This structure provides the same advantage when the flowing direction of the fluid to be measured is reversed.

Third Embodiment

Figure 7:
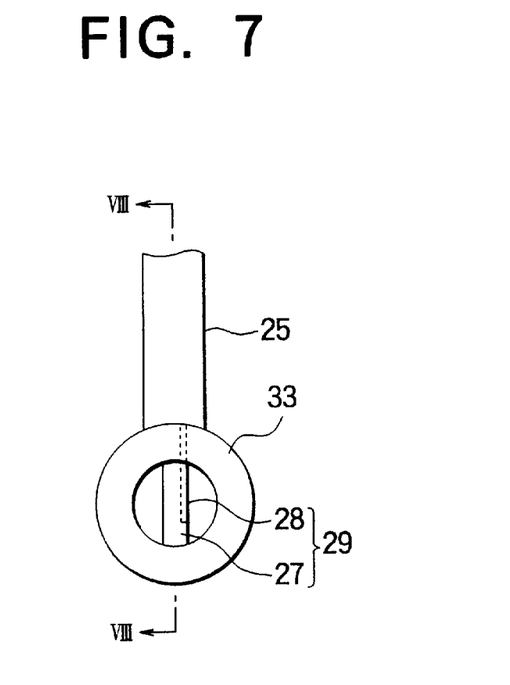
FIG. 7 is a front view showing a flow rate detector according to a third embodiment of the present invention.
Figure 8:
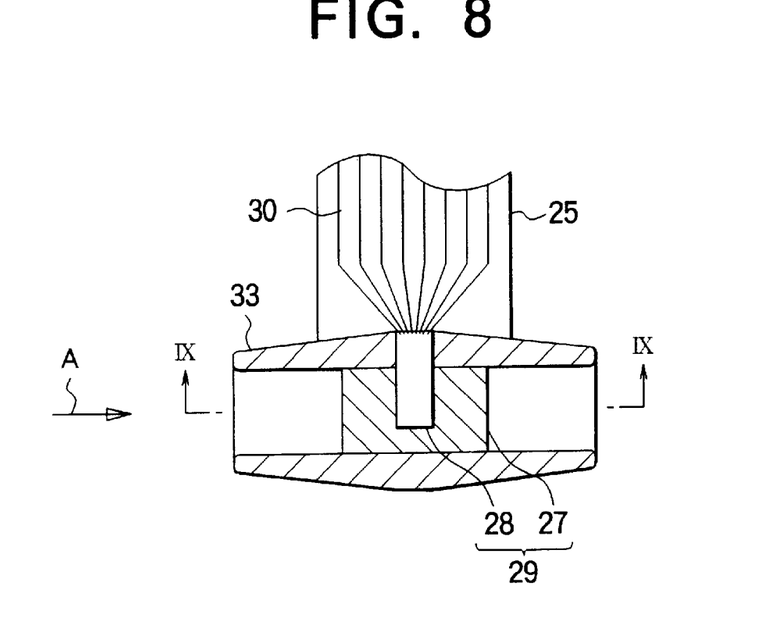
FIG. 8 is a sectional view at the line VIII—VIII in FIG. 7.
Figure 9:
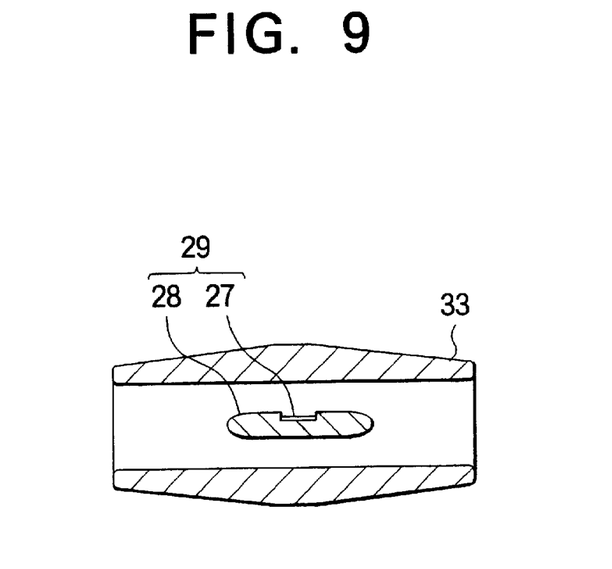
FIG. 9 is a sectional view at the line IX—IX in FIG. 8.

FIG. 7 is a front view showing a flow rate detector according to a third embodiment of the present invention; FIG. 8 is a sectional view at the line VIII—VIII in FIG. 7; and FIG. 9 is a sectional view at the line IX—IX in FIG. 8. In this embodiment, the outside diameter of a detection pipe 33 is gradually decreased from the longitudinal center toward both ends thereof. More specifically, the upstream outside diameter of the detection pipe 33 gradually increases toward the downstream side, whereas the downstream outside diameter gradually decreases toward the downstream side. The rest of the configuration of the third embodiment is identical to the configuration of the first embodiment previously described.

The flow rate detector according to the third embodiment is able to prevent the flow from being separated at the outer peripheral surface of the detection pipe 33 and to restrain the generation of eddies from the leading edge of the detection pipe 33, thereby allowing a pressure drop to be reduced. This advantage is especially marked when the flow of a fluid to be measured is deflected.

Fourth Embodiment

Figure 10:
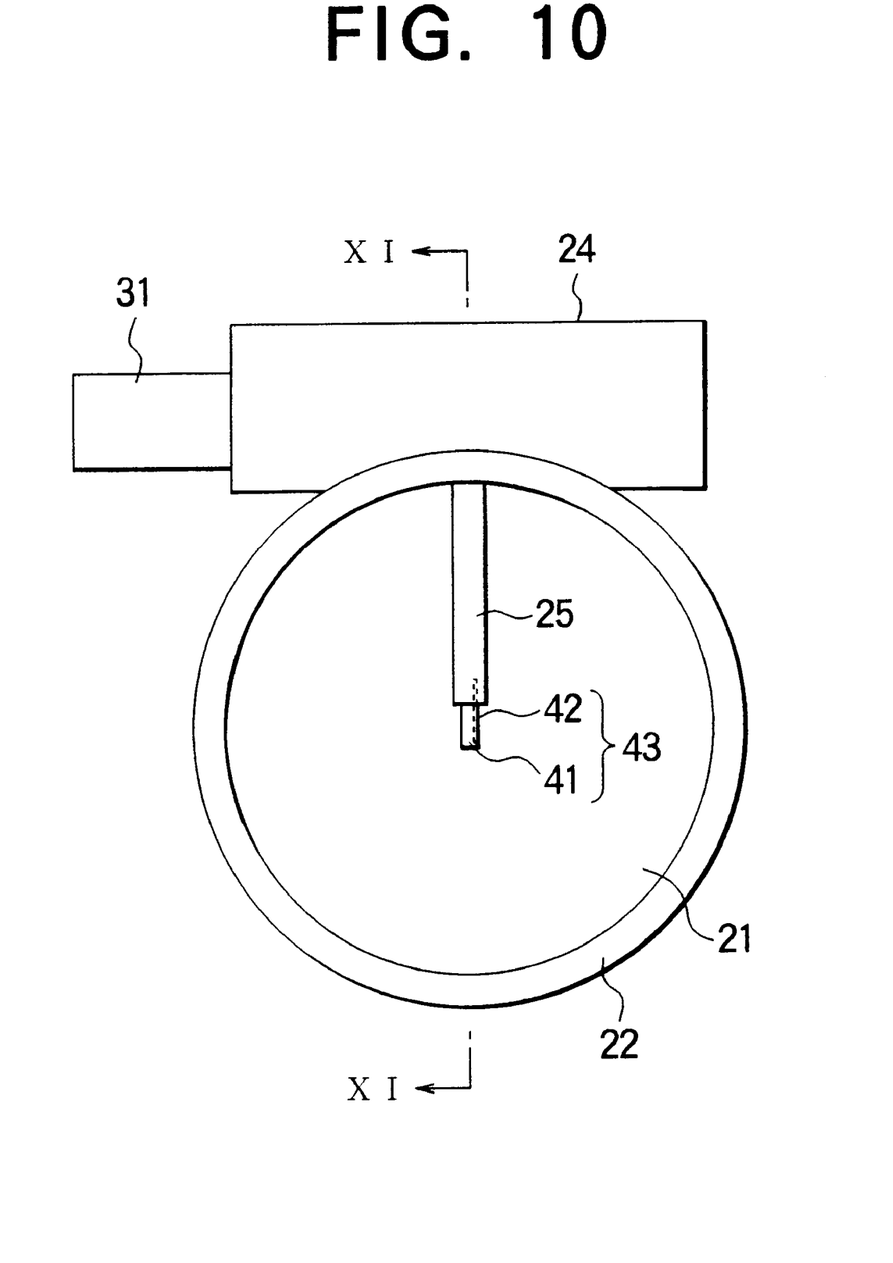
FIG. 10 is a front view showing a flow rate detector according to a fourth embodiment of the present invention.
Figure 11:
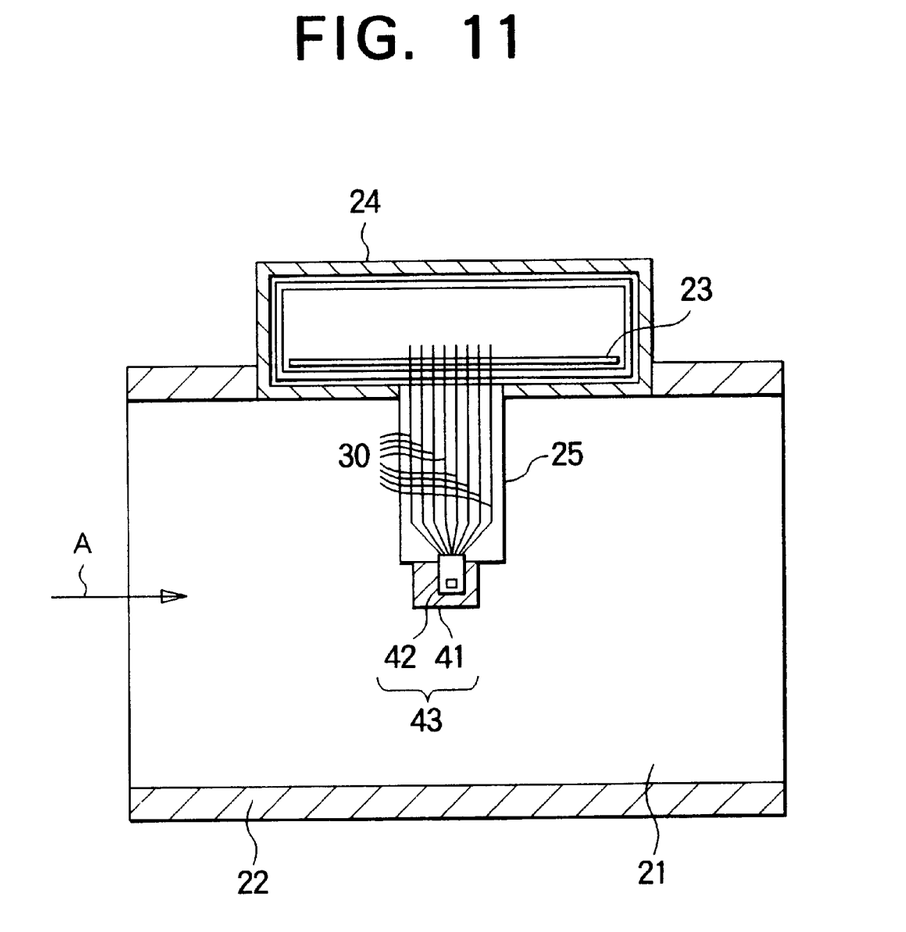
FIG. 11 is a sectional view at the line XI—XI in FIG. 10.

FIG. 10 is a front view showing a flow rate detector according to a fourth embodiment of the present invention; and FIG. 11 is a sectional view at the line XI—XI in FIG. 10. In the drawings, a supporting member 41 is fixed to the distal end of a prop 25 jutting out in the fluid channel 21. A thermosensitive flow rate sensor 42 is built in the supporting member 41. A detecting structure 43 is constituted by the supporting member 41 and the flow rate sensor 42.

Figure 12:
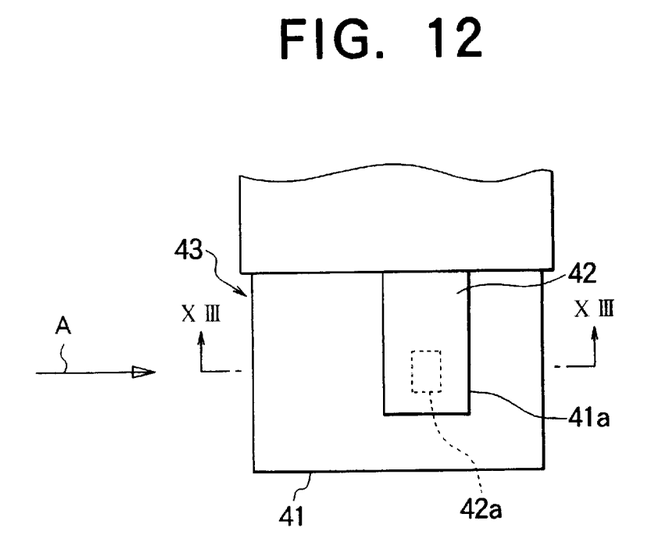
FIG. 12 is an enlarged side view of a detecting structure in FIG. 11.
Figure 13:
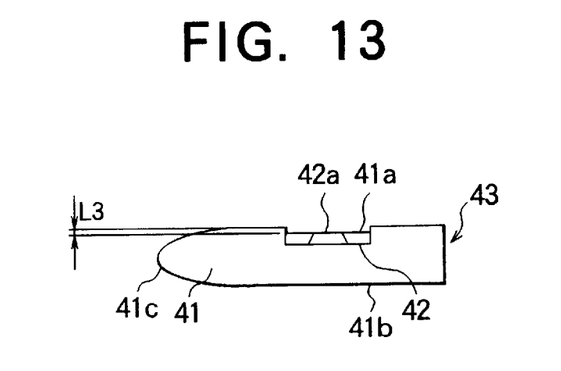
FIG. 13 is a sectional view at the line XIII—XIII in FIG. 12.

FIG. 12 is an enlarged side view of the detecting structure 43 in FIG. 11; and FIG. 13 is a sectional view at the line XIII—XIII in FIG. 12. The supporting member 41 has a sensor holding portion 41b which has a predetermined width and which is provided with a recession 41a in a side surface thereof, and a broadening portion 41c which is adjacent to one end of the sensor holding portion 41b and which gradually broadens from the distal end thereof toward the sensor holding portion 41b. The flow rate sensor 42 is installed in the recession 41a such that it is recessed from the side surface of the sensor holding portion 41b.

More specifically, the surface of the flow rate sensor 42 is not flush with the side surface of the supporting member 41; it is disposed so that it is recessed from the side surface by dimension L3. Dimension L3 is designed such that it does not become zero when the flow rate sensor 42 is installed in the supporting member 41 even when manufacturing errors are taken into account. Hence, even if the supporting member 41 and the flow rate sensor 42 have manufacturing errors, the flow rate sensor 42 does not project from the side surface of the sensor holding portion 41b.

In such a flow detector, the flow rate sensor 42 is installed so that it is always recessed from the side surface of the supporting member 41, thus minimizing variations in the detecting characteristics from one detector to another. In addition, the dust in the fluid to be measured is prevented from adhering to the leading edge of the flow rate sensor 42; therefore, a change in the flow rate detecting characteristics can be prevented for an extended period of time.

Figure 14:
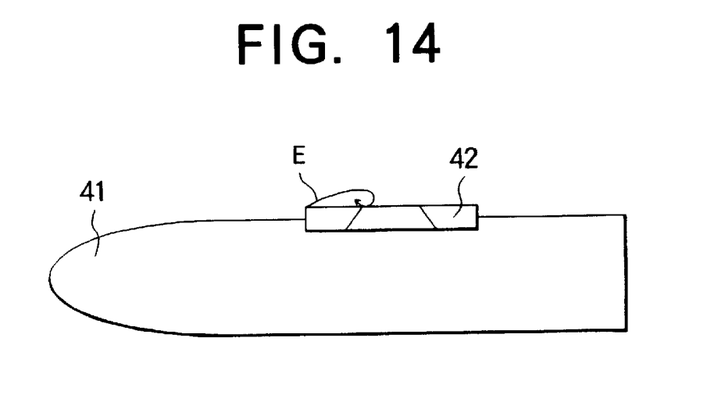
FIG. 14 is a schematic representation showing the flow of a fluid to be measured which is observed when a thermosensitive flow rate sensor juts out of a side surface of a support member.
Figure 15:
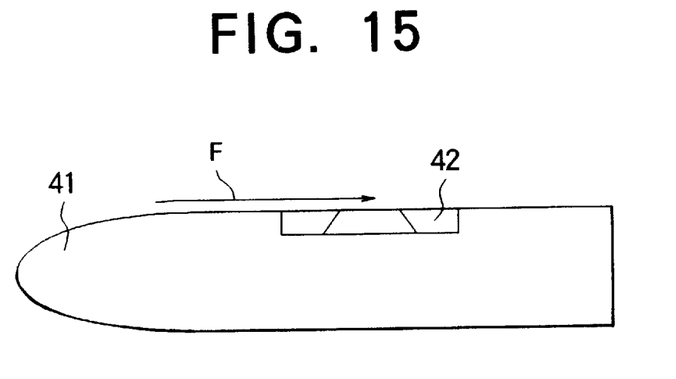
FIG. 15 is a schematic representation showing the flow of the fluid to be measured which is observed when the surface of the thermosensitive flow rate sensor is flush with the side surface of the support member.
Figure 16:
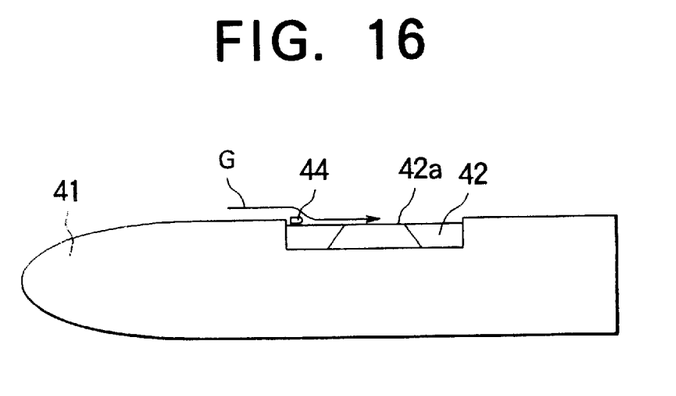
FIG. 16 is a schematic representation showing the flow of the fluid to be measured which is observed when the thermosensitive flow rate sensor is recessed from the side surface of the support member.
Figure 17:
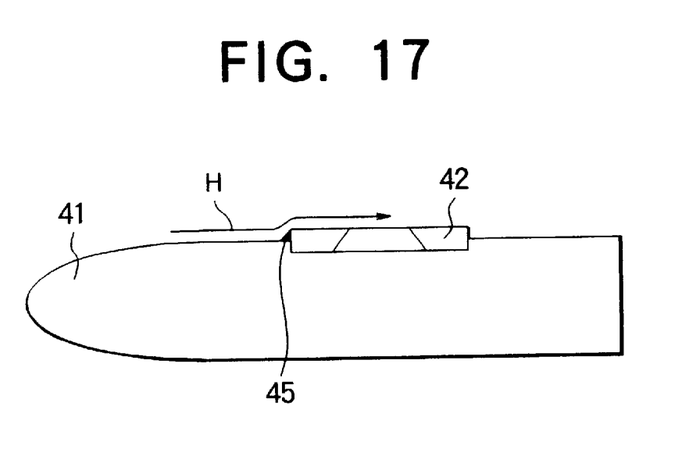
FIG. 17 is a schematic representation showing the flow of the fluid to be measured which is observed when dust has adhered to the leading edge of the thermosensitive flow rate sensor in FIG. 14.

FIG. 14 is a schematic representation showing the flow of a fluid to be measured which is observed when the flow rate sensor juts out of the side surface of the supporting member; FIG. 15 is a schematic representation showing the flow of the fluid to be measured which is observed when the surface of the flow rate sensor is flush with the side surface of the supporting member; FIG. 16 is a schematic representation showing the flow of the fluid to be measured which is observed when the flow rate sensor is recessed from the side surface of the supporting member; and FIG. 17 is a schematic representation showing the flow of the fluid to be measured which is observed when dust has adhered to the leading edge of the flow rate sensor in FIG. 14. In the drawings, arrows E through H indicate the lines of flow of the fluid to be measured.

As shown in FIG. 14, when the flow rate sensor 42 projects from the side surface of the supporting member 41, the flow separates at the leading edge of the flow rate sensor 42, then it adheres again on the downstream side thereof. When, as shown in FIG. 15, the surface of the flow rate sensor 42 is flush with the side surface of the supporting member 41, the fluid to be measured flows along the surface of the flow rate sensor 42. In a state illustrated in FIG. 16, a stagnant spot 44 is produced at the stepped portion.

Thus, as the way the flow rate sensor 42 is installed, the way the fluid to be measured flows significantly changes, and the heat conductivity on the surface of the flow rate sensor 42 accordingly varies, leading to variations in the flow rate detecting characteristics.

In the fourth embodiment, however, the flow rate sensor 42 always remains recessed; therefore, changes in the flow of the fluid to be measured from one flow rate detector to another can be restrained. Furthermore, a flow rate detecting portion 42a of the flow rate sensor 42 is located on the downstream side sufficiently away from the stagnant spot 44; therefore, changes in the flow rate detecting characteristics can be restrained.

When the flow rate detector shown in FIG. 14 is used for an extended period of time, dust 45 adheres to and builds up on the leading edge of the flow rate sensor 42 as illustrated in FIG. 17. In such a case, the state of the flow changes, causing the flow rate detecting characteristics to fluctuate. In the case of the flow rate sensor 42 which is recessed from the side surface of the supporting member 41 as shown in FIG. 16, the adherence of the dust 45 can be prevented.

The fourth embodiment described above is not equipped with a detection pipe; however, it may be equipped with a detection pipe.

In all the embodiments described above, the flow rate sensors which employ heat generating resistors and temperature measuring resistors have been shown, but the flow rate sensor according to the present invention is not limited thereto; it may have, for example, only one heat generating resistor or a plurality of heat generating resistors to detect flow rate according to the values of the heating current of the heat generating resistors.

What is claimed is:

1. A flow rate detector comprising:
   a detection pipe provided in a fluid channel;
   a supporting member disposed centrally within said detection pipe, said supporting member having a sensor holding portion and a broadening portion, said sensor holding portion having a predetermined width, said broadening portion being adjacent to one end of said sensor holding portion, the width of said broadening portion gradually increasing from its distal end toward said sensor holding portion; and
   a thermosensitive flow rate sensor built in a side surface of said sensor holding portion so that it is exposed in said detection pipe;
   wherein said detection pipe has a straight pipe portion on the upstream side of said supporting member, and said straight pipe portion has a predetermined inside diameter D and has a length L1, wherein said predetermined inside diameter D and said length L1 define a relation $L1 \geq D/2$.

2. A flow rate detector according to claim 1, wherein said broadening portion is provided at both ends of said sensor holding portion.

3. A flow rate detector according to claim 1, wherein said fluid channel is formed in a main channel pipe, and said detection pipe is disposed coaxially with respect to said main channel pipe.

4. A flow rate detector according to claim 1, wherein a straight pipe portion having a length which is half the inside diameter or greater of said detection pipe and which has a predetermined inside diameter, is provided on the downstream side of said supporting member of said detection pipe.

5. A flow rate detector according to claim 1, wherein said detection pipe has a bell-mouthed fluid inlet.

6. A flow rate detector according to claim 1, wherein the outside diameter of said detection pipe gradually decreases from the longitudinal center thereof toward both ends thereof.

7. A flow rate detector according to claim 1, wherein said sensor holding portion is provided with a recession in a side surface thereof, and said thermosensitive flow rate sensor is installed in said recession so that it is recessed from the side surface of said sensor holding portion.

8. A flow rate detector comprising:
   a supporting member provided in a fluid channel, said supporting member having a sensor holding portion and a broadening portion, said sensor holding portion having a predetermined width and being provided with a recession in a side surface thereof, said broadening portion being adjacent to one end of said sensor holding portion, the width of said broadening portion gradually increasing from its distal end toward said sensor holding portion; and
   a thermosensitive flow rate sensor which is installed in said recession so that it is recessed from said side surface of said sensor holding portion, thereby forming a stepped portion with respect to said side surface.

9. A flow rate detector according to claim 8, wherein said broadening portion is provided at both ends of said sensor holding portion.

10. A flow rate detector comprising:
    a detection pipe provided in a fluid channel;
    a supporting member disposed within said detection pipe, said supporting member disposed so that it completely divides the section orthogonal to the axis of said detection pipe into two equal segments to minimize fluid flow rate variations, said supporting member having a sensor holding portion and a broadening portion, said sensor holding portion having a predetermined width, said broadening portion being adjacent to one end of said sensor holding portion, the width of said broadening portion gradually increasing from its distal end toward said sensor holding portion; and a thermosensitive flow rate sensor built in a side surface of said sensor holding portion so that it is exposed in said detection pipe;

wherein said detection pipe has a straight pipe portion on the upstream side of said supporting member, and said straight pipe portion has a predetermined inside diameter D and has a length L1 to minimize fluid flow rate variations, wherein said predetermined inside diameter D and said length L1 define a relation $L1 \geq D/2$.

11. A flow rate detector according to claim 10, wherein a straight pipe portion having a length which is half the inside diameter or greater of said detection pipe and which has a predetermined inside diameter, is provided on the downstream side of said supporting member of said detection pipe.

12. A flow rate detector according to claim 10, wherein said detection pipe has a bell-mouthed fluid inlet.

13. A flow rate detector according to claim 10, wherein the outside diameter of said detection pipe gradually decreases from the longitudinal center thereof toward both ends thereof.

14. A flow rate detector according to claim 10, wherein said sensor holding portion is provided with a recession in a side surface thereof, and said thermosensitive flow rate sensor is installed in said recession so that it is flush with the side surface of said sensor holding portion.

15. A flow rate detector according to claim 10, wherein the surface of said thermosensitive flow rate sensor is opposed to an inner wall surface of said detection pipe.

* * * * *